United States Patent [19]

Aoshima et al.

[11] Patent Number: 4,994,663
[45] Date of Patent: Feb. 19, 1991

[54] LIGHT INTENSITY CORRELATING APPARATUS

[75] Inventors: Shinichiro Aoshima; Tsuneyuki Urakami; Yutaka Tsuchiya, all of Shizuoka, Japan

[73] Assignee: Hamamatsu Photonics Kabushiki Kaisha, Shizuoka, Japan

[21] Appl. No.: 355,608

[22] Filed: May 23, 1989

[30] Foreign Application Priority Data

May 30, 1988 [JP] Japan ................... 63-132050

[51] Int. Cl.$^5$ ............................. H01J 40/14
[52] U.S. Cl. ..................... 250/214 R; 324/77 K
[58] Field of Search ............... 324/77 K; 250/208.2, 250/214 R, 214 A

[56] References Cited

U.S. PATENT DOCUMENTS 4,328,576  5/1982  Oakley ........................ 324/77 K
4,480,192  10/1984  Albrecht et al. ............ 324/77 K
4,644,267  2/1987  Tsui et al. .................... 324/77 K
4,777,433  10/1988  Steele et al. ................. 324/77 K Primary Examiner—David C. Nelms
Assistant Examiner—Que Tan Le
Attorney, Agent, or Firm—Finnegan, Henderson, Farabow, Garrett, and Dunner

[57] ABSTRACT

An apparatus for measuring an autocorrelation wavaeform of intensity of input light comprises a beam splitting means for dividing the input light into two light beams, a photoelectric converter for converting one of the divided beams into an electrical signal, an optical modulating means for modulating the other light beam in accordance with the electrical signal, a delay means for varying a relative delay time between arrival times to the optical modulating means of the light beam and the electrical signal, and a photodetector having a response speed faster than that of the delay time variation for detecting output light from the optical modulating means.

9 Claims, 7 Drawing Sheets

BREWSTER'S ANGLE

LIGHT INTENSITY CORRELATING APPARATUS

BACKGROUND OF THE INVENTION

The present invention relates to an apparatus for measuring the autocorrelation waveform of the intensity of input light. More particularly, the present invention relates to a novel apparatus that is capable of measuring the autocorrelation waveform of the intensity of input light without employing the conventional two-photon fluorescence method or second-harmonic generation method.

Lasers such as mode-locked dye lasers, solid-state lasers and semiconductor lasers emit light pulses of the picosecond order. Such short pulses cannot be measured by a conventional method wherein the light to be measured is received by a variety of photoelectric detectors and converted into an electrical pulse signal, and wherein the electrical pulse signal is supplied to a variety of oscilloscopes for imaging on a CRT screen. To overcome this difficulty, nonlinear correlating techniques have been developed for indirectly determining the pulse width and pulse interval on the basis of the measurement of the second-order autocorrelation waveform of the intensity of input light.

Nonlinear correlating techniques include the two-photon fluoresence (TPF) method which relies upon absorption of two photons, and the second-harmonic generation (SHG) method which employs a nonlinear crystal. In both methods, the light to be measured is divided into two beams with a beam splitter, one light beam is allowed to travel over a longer distance such that it is delayed by time $\tau$, the two light beams are then superimposed and launched into a material that exhibits nonlinear optical effects, and an output signal from this material is examined. Since a strong output signal is obtained when two light pulses are actually superposed, one can determine the pulse width and pulse interval by measuring the intensity of the output signal as a function of delay time $\tau$.

FIG. 21 is a schematic drawing of the most common two-photon fluorescence system for measuring the pulse width of a strong single pulse such as the one emitted from a mode-locked pulse solid-state laser or a pulse dye laser. The laser pulse to be measured is divided into two beams of equal intensity with a 50% beam splitter 10, the two beams are reflected from mirrors 12 and 14 in such a way that they travel in opposite directions to be launched into a fluorescent liquid cell 16 which is filled with a highly fluorescent dye solution that has an energy absorption band corresponding to twice the frequency of the light to be measured and generates two-photon fluorescence light. In the cell 16, the two beams travel in opposite directions and a coordinate along the beam path is proportional to the delay time $\tau$. Since strong absorption of two photons occurs in a position in the cell 16 where the two light pulses are actually superposed, the autocorrelation waveform of the laser pulse to be measured can be obtained by picking up resulting fluorescent light with a camera 18.

The two-photon fluorescence method described above has the advantage of being convenient but it is not capable of yielding as precise data as that attained by the second-harmonic generation method.

FIG. 22 is a schematic drawing showing the principle of the second-harmonic generation method for measuring the pulse width of a series of comparatively weak but very rapidly repeating pulses such as those emitted from mode-locked CW (continuous wave) dye lasers and semiconductor lasers. The laser pulse to be measured is divided into two beams with a beam splitter 20. One beam passes through a polarizer 22 to be launched into a fixed mirror 26, and the other beam passes through another polarizer 24 to be launched into a moving mirror 28 that optically produces a delay time $\tau$. The polarizer 22 has a plane of polarization which is perpendicular to that of polarizer 24. The two beams reflected from the mirrors 6 and 28 are superposed by the beam splitter 20. The resulting optical signal passes through a nonlinear optical crystal (SHG crystal) 30 which generates a second harmonic wave, then through an interference filter 32 which selectively extracts the second harmonic wave, and is launched into an SHG light detector 34. The SHG crystal 30 will generate a second harmonic wave only when the two pulses are actually superposed. Consequently, by measuring the intensity of the generated second harmonic wave with the SHG detector 34, the autocorrelation waveform of the laser pulse of interest can be obtained.

An improved background-free version of the second-harmonic generation method has been recently developed; in this modification, a second harmonic wave is generated by launching two beams into the SHG crystal 30 at angles symmetrical with respect to the optical axis and an effective signal component is selectively picked up in the axial direction.

The second-harmonic generation method described above is capable of more precise measurements than the two-photon fluorescence method, but it suffers from the disadvantage that expensive materials such as KDP (Potassium Dihydrogen Phosphate), $LiIO_3$, and ADP (Ammoniun Dihydrogen Phosphate) have to be used as the SHG crystal 30. In particular, some of these SHG materials including KDP are deliquescent and difficult to handle. In addition, the conditions for generating a second harmonic wave are very strict and in order to obtain it, phase matching conditions must be satisfied by properly controlling the temperature of the SHG crystal or the incident angle of light. This involves very complicated and cumbersome adjustments. Furthermore, the efficiency of second harmonic wave generation is generally low, e.g., only about several percent although the exact value depends on specific conditions. The interference filter 32, a pinhole plate, or some other device must be employed to separate the generated second harmonic wave from the fundamental wave. However, combined with the low SHG efficiency, it is very difficult to detect the generated second harmonic wave by such devices.

SUMMARY OF THE INVENTION

An object, therefore, of the present invention is to provide an apparatus that is capable of simple measurement of the autocorrelation waveform of the intensity of input light by an entirely new method without relying upon the two-photon fluorescence method or second-harmonic generation method.

This object of the present invention can be attained by an apparatus for measuring the autocorrelation waveform of the intensity of input light comprising beam splitting means for dividing the input light into two light beams, a photoelectric converter for converting one of the two light beams into an electrical signal, an optical modulating means for modulating the intensity of the other light beam in accordance with the output electrical signal from the photoelectric converter, delay means for varying a relative delay time between the optical signal to be inputted into the optical modulating means and the output electrical signal from the photoelectric converter, and a photodetector for detecting the output light from the optical modulating means at a faster response speed than a speed at which the delay time is varied by the delay means. An output of the photodetector can be measured as a function of the delay time over the delay means.

In a preferred embodiment of the present invention, a current amplifier or a voltage amplifier is inserted between the photoelectric converter and the optical modulating means.

In another preferred embodiment, a bias current or a constant voltage is applied to the optical modulating means.

In still another preferred embodiment, the optical modulating means comprises an optical amplifier that amplifies an optical signal and that has a gain which varies in accordance with an electrical signal.

In a further embodiment, the optical amplifier comprises a non-resonant traveling-wave type optical amplifier characterized by suppressed reflection from both end faces of a semiconductor laser.

In a still further embodiment, the optical modulating means an electro-optical effect of a nonlinear optical medium such that its gain varies in accordance with an electrical signal.

In another preferred embodiment, the delay means comprises an electrical delay circuit that delays the output electrical signal from the photoelectric converter by a variable amount, and an optical fiber is employed in the optical path portions.

In still another preferred embodiment, the apparatus of the present invention further includes a light chopping device between the beam splitting means and the photodetector for turning optical signal on and off at a predetermined frequency, and a lock-in amplifier for receiving the output from the photodetector only over a narrow band corresponding to the predetermined frequency.

In a further embodiment, the optical modulating means itself is designed to operate as the light chopping device.

DETAILED DESCRIPTION OF THE PREFERRED EMBODIMENTS

Figure 1:
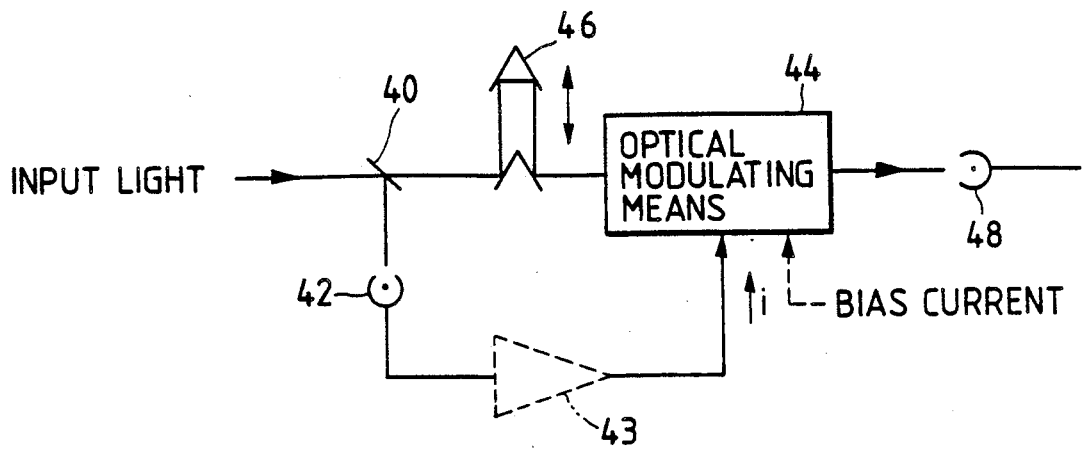
FIG. 1 is a block diagram showing one basic composition of an apparatus of the present invention.

One basic composition of an apparatus of the present invention for measuring the autocorrelation waveform of the intensity of input light is shown in FIG. 1. The input light to be measured is divided into two light beams with a beam splitting means 40. One of the two light beams is converted into an electrical signal (i) by a photoelectric converter 42. The intensity of the other light beam is modulated by an optical modulating means 44 in accordance with the output electrical signal (i) from the photoelectric converter 42. A relative delay time between the optical signal to be inputted into the optical modulating means 44 and the output electrical signal from the photoelectric converter 42 is varied with a delay means 46 (in FIG. 1, an optical delay means for delaying the optical signal). An output light from the optical modulating means 44 is detected with a photodetector 48 having a faster response speed than a speed at which the delay time is varied by the delay means 46. An output of the photodetector 48 can be measured as a function of the delay time over the delay means 46. In short, the apparatus of the present invention obtains the autocorrelation waveform of the intensity of the input light by attaining, with the optical modulating means 44, the correlation between the optical signal launched into the modulating means and the electrical signal (i) used to modulate the optical signal. This apparatus does not use an expensive and difficult-to-handle SHG crystal which is required in the conventional second-harmonic generation method and, consequently, the apparatus of the present invention can be manufactured at low cost and can be handled with great ease. In addition, the absence of the need to change wavelength provides for high efficiency, simple circuit composition, and easy detection. Furthermore, the optical system used in this apparatus is simple in composition and needs no close adjustments. The apparatus does not employ any moving parts. As a further advantage, the efficiency of detection with this apparatus is high enough to enable measurement of continuous wave light having a small peak power, so that, for example, a vibrating frequency component of a surface can be determined by measuring the intensity of light scattered from it.

Examples of the beam splitting means 40 that can be used in the present invention include a half mirror, a beam splitter, a cubic beam splitter, a fiber beam splitter, etc.

Examples of the photoelectric converter 42 that can be used in the present invention are high-speed photodetectors such as a photomultiplier tube, a photomultiplier tube with a built in multichannel plate, and a PIN photodiode.

As shown by a dashed line in FIG. 1, a bias current may be applied to the optical modulating means 44, and/or a current amplifier 43 that amplifies the output signal of the photoelectric converter 42 may be inserted between the photoelectric converter 42 and the modulating means 44. In this case, the intensity of the output optical signal from the modulating means 44 can be made higher than that of the input optical signal thereto even if the photoelectric converter 42 has no more than 100% efficiency of photoelectric conversion. If the optical modulating means 44 is of a voltage-controlled type, a bias voltage may be applied to the modulating means and/or a voltage amplifier may be inserted between the photoelectric converter 42 and the optical modulating means 44. If the photoelectric converter 42 itself has an amplifying action as in the case of a photomultiplier tube, it is not absolutely necessary to apply a bias current (or voltage) or insert a current (or voltage) amplifier 43.

The optical modulating means 44 may be an optical amplifier that is capable of direct amplification of an optical signal and whose gain is variable by an electrical signal, or an optical modulator that utilizes the electro-optic effect of a nonlinear optical medium and whose gain is adjustable by an electrical signal. When an optical amplifier is used as the optical modulating means 44, an amplified optical signal can be detected, so that it becomes possible to measure even very weak pulse light.

The optical amplifier that is capable of producing an optical output by amplifying input light by a factor that is dependent on an external electrical signal is available in various types including: a non-resonant traveling-wave type optical amplifier (TWA) which has an anti-reflection film coated on both end faces of a semiconductor laser to suppress reflection from those faces, a Fabry-Perot type optical amplifier (FPA) which uses a conventional semiconductor laser as an optical amplifier with it being biased below the threshold level for oscillation, an optical fiber Raman amplifier which utilizes Raman scattering induced in an optical fiber, an amplifier using a DFB laser, and an injection synchronous amplifier. Semiconductor amplifiers are advantageous because of their compactness and ease of control in operation.

Among semiconductor optical amplifiers, TWA and FPA are particularly advantageous. TWA has fast response to electrical signals and is capable of amplification of high speed optical signals. Because of the absence of resonator-dependent selectivity for wavelength, TWA has a broad (ca. 50 nm) wavelength range for gain and assures consistency in gain in the face of variations in the temperature of the amplifier or in the wavelength of incident light. TWA is also superior in terms of gain saturation and noise characteristics which are two important characteristics of an optical amplifier. On the other hand, FPA is easy to fabricate and allows a high gain to be attained in the neighborhood of a threshold value even with low current injection because it utilizes multiple reflections between both end faces to produce signal gain.

Another advantage of the semiconductor optical amplifiers is that their gain can be easily adjusted by changing the amount of injection current, so they can also be used as an optical switch by turning on or off the injection of current.

Figure 2:
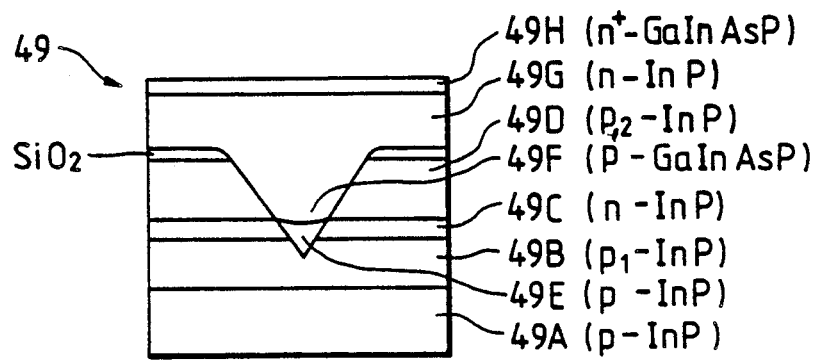
FIG. 2 is a cross section showing an illustrative composition of a semiconductor laser which is the main component of a traveling-wave type optical amplifier (TWA) that is an example of an optical modulating means in the apparatus of the present invention.

A TWA that is suitable for use in the present invention has an anti-reflection film coated on both end faces of a semiconductor laser 49 of the VIPS (V-grooved inner stripe on p-substrate) structure shown in FIG. 2, which may be formed by the following steps: in the first cycle of liquid-phase growth, a $p_1$-InP buffer layer 49B, an n-InP block layer 49C, and a $p_2$-InP block layer 49D are grown on a p-InP substrate 49A; and thereafter a V-shaped groove having a (111)B face is formed in 49B, 49C and 49D by wet etching, with a $SiO_2$ stripe mask being prepared by a conventional photolithographic process; and in the second cycle of liquid-phase growth, a p-InP cladding layer 49E, a p-type or undoped GaInAsP active layer 49F, an n-InP cladding layer 49G, and an $n^+$-GaInAsP contact layer 49H are grown successively. The GaInAsP active layer 49F is formed at the bottom of the V-shaped groove, with its width and thickness being controlled to ca. 1.2 $\mu$m and 0.10 $\mu$m, respectively. Thereafter, electrodes are formed and end faces are created by cleavage. An anti-reflection film is then deposited onto both end faces of the resulting semiconductor laser 49 using a material such as $SiO_2$ so as to fabricate a TWA. The semiconductor laser 49 of the VIPS structure has a sufficiently high efficiency of injection into the active layer to produce superior high output characteristics, so the TWA using this semiconductor laser also produces high gain and highly saturated output.

Figure 3:
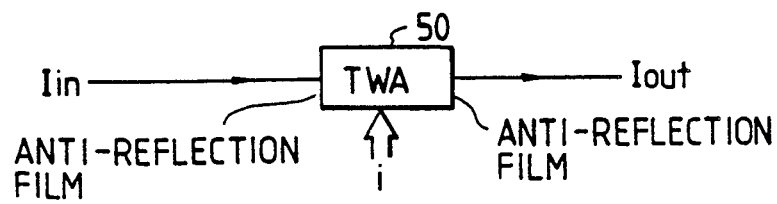
FIG. 3 is a diagram illustrating the operating characteristics of the TWA.
Figure 4:
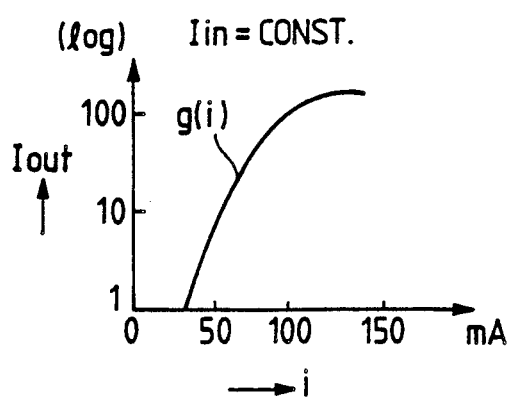
FIGS. 4 and 5 are diagrams illustrating two examples of the intensity characteristics of output light from the TWA.

The TWA 50 thus fabricated has a basic composition as shown in FIG. 3. When the intensity of input light $I_{in}$ being launched into the TWA 50 is constant, the intensity of output light $I_{out}$ from the TWA 50 will change nonlinearly as shown in FIG. 4 in response to the change in input current i. If the value of input current i to the TWA 50 is constant, $I_{out}$ will change also change nonlinearly as shown in FIG. 5 in response to the change in $I_{in}$.

Figure 5:
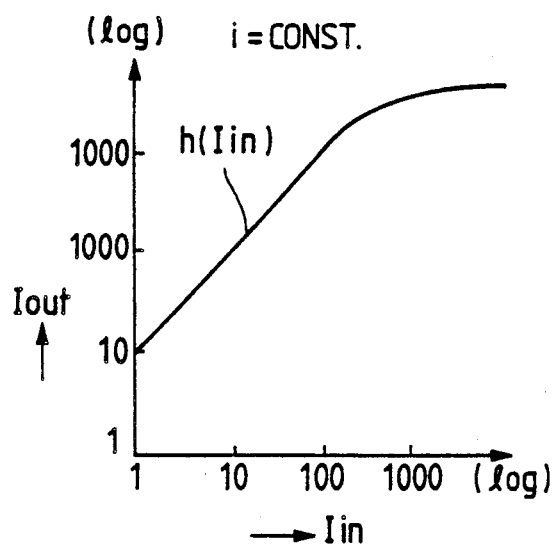
Figure 6:
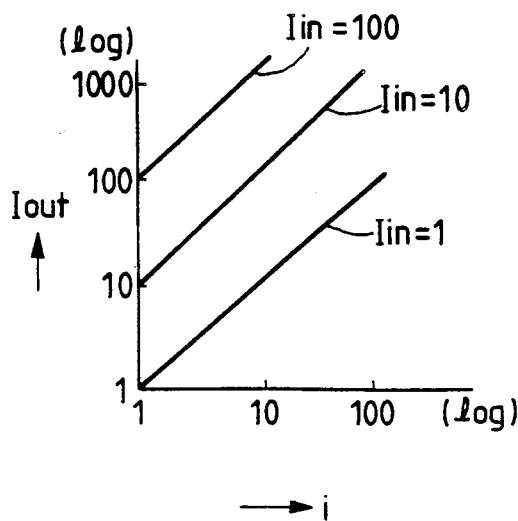
FIGS. 6 and 7 are simplified diagrams for FIGS. 4 and 5, respectively.
Figure 7:
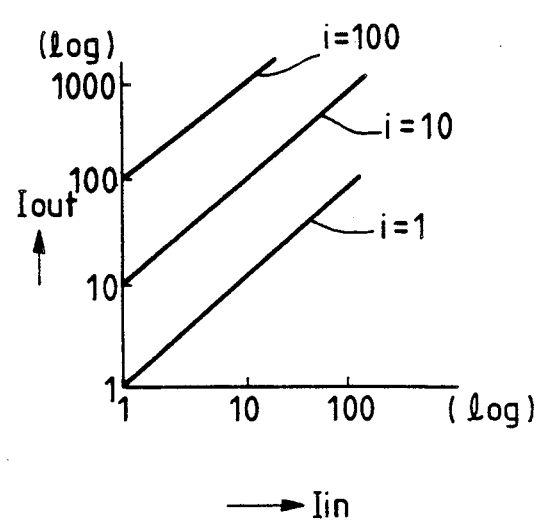

If it is assumed that only the linear portion of each curve is used for the sake of convenience (the nonlinear portion could be corrected if necessary), the relationship shown in FIG. 4 is transformed into a set of lines as shown in FIG. 6, and the relationship shown in FIG. 5 is transformed into a set of lines as shown in FIG. 7. Therefore, TWA 50 can be used as a linear amplifier over the ranges shown in FIGS. 6 and 7.

Figure 8:
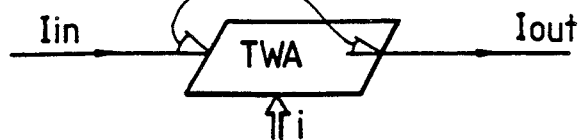
FIG. 8 is a schematic drawing of a modified version of the TWA.

In the TWA 50, reflection from both end faces is suppressed by the anti-reflection film coated thereon. It should, however, be noted that the anti-reflection film is not the sole mechanism for suppressing reflection from both end faces of the semiconductor laser and the same results can be attained by cutting each of the end faces at an angle equal to Brewster's angle as shown in FIG. 8. In this case, the plane of polarization is restricted which may be an advantage rather than a disadvantage when a need arises for restricting the plane of polarization because this need can be met without employing any polarizer or analyzer.

Figure 9:
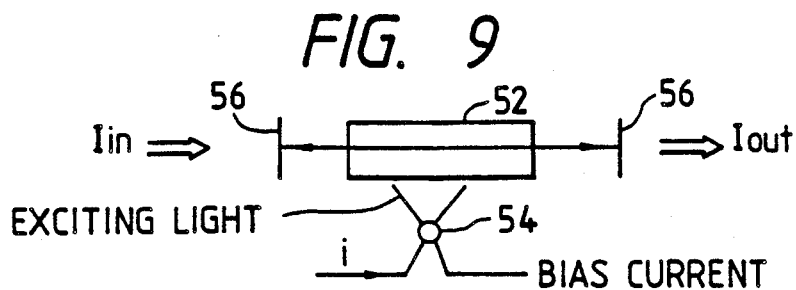
FIGS. 9–12 are schematic drawings showing other modifications of the optical amplifier used in the apparatus of the present invention.
Figure 10:
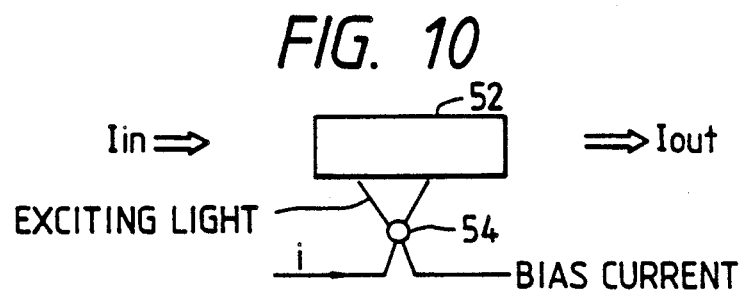

Besides the TWA 50 and FPA described above, other types of optical amplifiers can be used in the present invention, including the resonant optical amplifier shown in FIG. 9 which is biased to a level below the threshold for oscillation by imparting excitation light to a solid laser medium 52 with a laser diode 54, and the nonresonant optical amplifier shown in FIG. 10 that is similar to TWA in which reflection from both end faces of the solid laser medium 52 is suppressed by providing an anti-reflection film or adjusting the angle of each end face to be equal to Brewster's angle. In FIG. 9, the numeral 56 designates a resonant mirror. The laser diode 54 may or may not be supplied with a bias current for attaining a value in the neighborhood of the threshold level.

Figure 11:
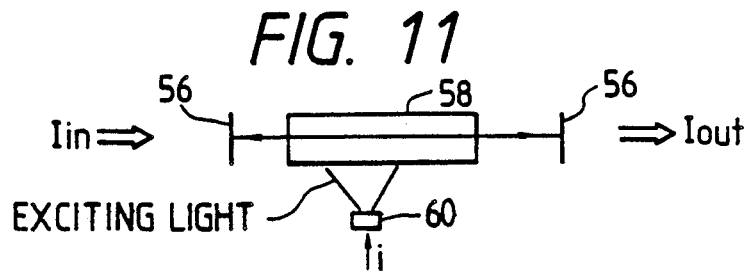

Another type of optical amplifier that can be used in the present invention is shown in FIG. 11, in which a dye or gas laser medium 58 is excited with light from a laser diode, light-emitting diode, or a current controlled lamp 60. Resonant mirrors 56 may be omitted from the system shown in FIG. 11.

Figure 12:
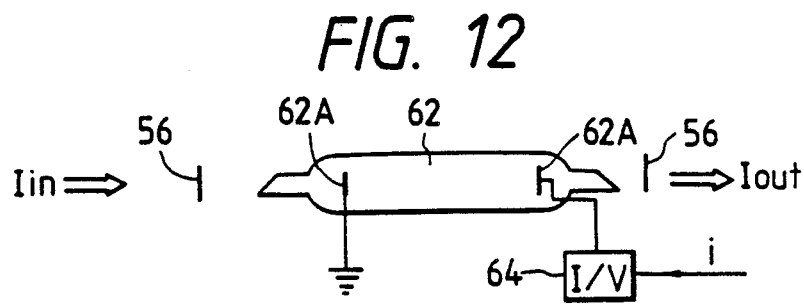

Still another type of optical amplifier that can be used in the present invention is shown in FIG. 12, in which a gas laser medium 62 is excited by discharge, or the voltage applied between electrodes 62A from a current-to-voltage converter 64. Resonant mirrors 56 may be omitted from the system shown in FIG. 12.

Figure 13:
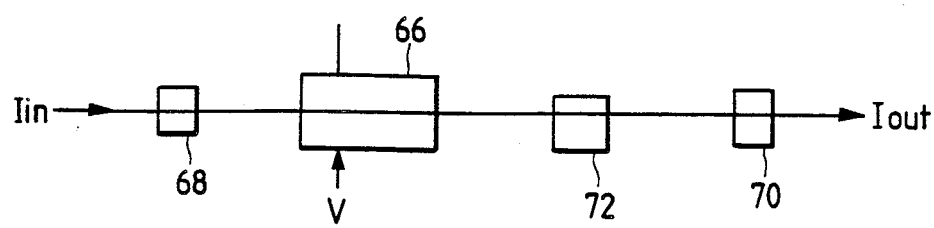
FIG. 13 is a schematic drawing showing the basic composition of another version of the optical modulating means which is an optical modulator employing a nonlinear optical medium.

In place of the optical amplifier, an optical modulator of a type that utilizes an electro-optical effect of a nonlinear optical medium and that has a gain which is variable by an electrical signal may be used as the optical modulating means 44. An example of this type of optical modulator is shown in FIG. 13 and is composed of a polarizer 68, a nonlinear optical medium 66 which receives output light from the polarizer 68, and an analyzer 70 which extracts a component of predetermined polarization from light outputted from the nonlinear optical medium 66, with a compensator 72 being optionally inserted between the medium 66 and the analyzer 70.

If Pockels effect is to be used, the nonlinear optical medium 66 may be in the form of a nonlinear optical crystal such as $LiTaO_3$ or $LiNbO_3$. If the Kerr effect is to be used, a Kerr cell having $CS_2$ or some other material placed in a transparent container may be used.

Figure 14:
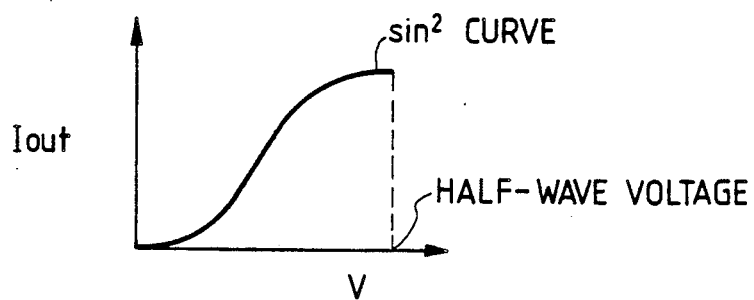
FIG. 14 is a diagram illustrating one example of the characteristics of the optical modulator shown in FIG. 13.

When a voltage V is applied to the nonlinear optical medium 66 having such electro-optic effects, light inputted into the medium 66 will undergo a change in the state of polarization as it passes through the medium. For example, when $LiTaO_3$ having the Pockels effect is placed between the polarizer 68 and analyzer 70, which have polarization directions perpendicular to each other, the intensity of output light $I_{out}$ vs the applied voltage V Will draw a curve of $\sin^2$ up to the half-wave voltage as shown in FIG. 14. It should be noted here that an optical modulator using the nonlinear optical medium 66 is to be controlled with a voltage signal rather than a current signal which controls the optical amplifier described above.

The delay means 46 may be an optical delay means which, as shown in FIG. 1, is inserted between the beam splitting means 40 and the optical modulating means 44 to change the optical path length of light, or alternatively it may be an electrical delay circuit that delays an output electrical signal from the photoelectric converter 42 by a variable amount. If necessary, a current (or voltage) amplifier 43 may be inserted between the photoelectric converter 42 and the optical modulating means 44. The optical delay means simplifies the composition of the electrical circuit of the system. The electrical delay circuit has the advantage of simplifying the composition of the delay means itself. Moreover, in this case, the optical paths in the system may be composed of optical fibers and this offers the advantage of not only eliminating the need for close adjustment of the optical units but also enhancing the degree of freedom in the layout of constituent elements, which enables, for example, a reduction in the size of the overall system.

Figure 15:
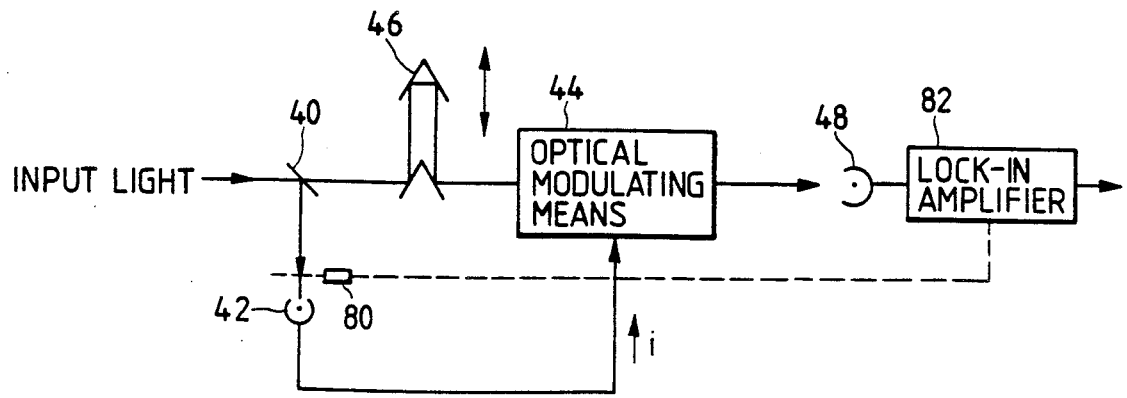
FIG. 15 is a block diagram showing another basic composition of the apparatus of the present invention.

The apparatus of the present invention which comprises basically the beam splitting means 40, photoelectric converter 42, optical modulating means 44, delay means 46, and photodetector 48 may further include, as shown in FIG. 15, a light chopping device 80 with which the optical signal between the beam splitting means 40 and the photodetector 48 (between the beam splitting means 40 and the photoelectric converter 42 in the case shown in FIG. 15) is turned on and off at a predetermined frequency, and a lock-in amplifier 82 which picks up the output from the photodetector 48 over a narrow band corresponding to the predetermined frequency. In this case, an improvement in SN ratio can be attained in addition to the advantages already described.

The light chopping device 80 may be a conventional light chopper. Other usable devices include the above-described optical amplifier, an optical modulator that makes use of electro-optical effects, and an A-0 modulator, as well as an optical Kerr shutter and a liquid-crystal shutter. When the optical amplifier whose gain is variable by an electrical signal is used as the light chopping device 80, the same advantages as those obtained when the optical amplifier is used as the optical modulating means 44 can be attained.

If the optical modulating means 44 is designed to operate not only as a modulator but also as the light chopping device 80, there is no need to employ a separate light chopping device, thus simplifying the composition of the overall system.

Specific embodiments of the present invention are described below in greater detail with reference to the accompanying drawings.

Figure 16:
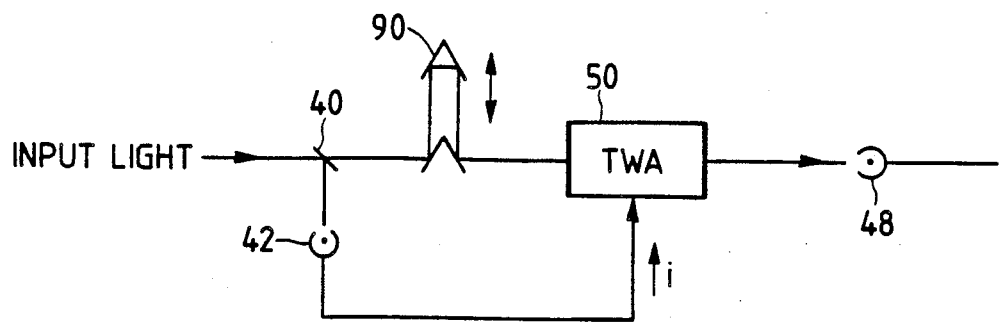
FIG. 16 is a block diagram showing the composition of a light intensity correlating apparatus according to a first embodiment of the present invention.

A first embodiment of the present invention is generally a light intensity correlating apparatus which comprises, as shown in FIG. 1, a beam splitting means 40, a photoelectric converter 42, an optical modulating means 44, a delay means 46, and a photodetector 48. This embodiment is shown more specifically in FIG. 16 wherein the optical modulating means 44 is composed of TWA 50, and the delay means 46 is designed as an optical delay means 90 which is capable of changing the optical path length between the beam splitting means 40 and the optical modulating means 44.

If desired, enhanced amplification may be performed with a current amplifier 43 (see FIG. 1) that is inserted between the photoelectric converter 42 and the TWA 50.

The operation of the first embodiment is described below. One of the two light beams obtained by the beam splitting means 40 is converted into an electrical signal by the photoelectric converter 42 and is supplied as current i to the TWA 50. If the photoelectric converter 42 is capable of reasonably high-speed response, the TWA 50 will receive an electrical signal that is similar in waveform to the input light to be measured.

For the sake of simplicity, assume that the TWA 50 has such characteristics that when the intensity of input light $I_{in}$ is constant, the intensity of output light $I_{out}=\alpha \cdot i$ ($\alpha$ is a proportionality constant) as shown in FIG. 6, and that when the input current i to the TWA is constant, $I_{out}=\beta \cdot I_{in}$ ($\beta$ is a proportionality constant) as shown in FIG. 7. Then, the following relation holds:

$$I_{out} \alpha I_{in} \cdot i. \qquad (1)$$

Since $i=\gamma \cdot I_{in}$ ($\gamma$ is a proportionality constant) when the relative delay between the electrical signal i and input light $I_{in}$ is zero, the following relation will hold:

$$I_{out} \alpha \gamma \cdot I_{in}^2. \qquad (2)$$

In other words, $I_{out} \alpha I_{in}^2$, that is, the intensity of output light $I_{out}$ is obtained as a quadratic function of the intensity of input light $I_{in}$. Therefore, by receiving the output light with the photodetector 48, the average output $G(\tau)$ of the photodetector is obtained as a function of delay time $\tau$ between the electrical signal i and input light $I_{in}$. If the waveform of input light $I_{in}$ obtained with the delay time $\tau$ is written as $f(t+\tau)$, $G(\tau)$ is given by:

$$G(\tau) \propto \int_{-\infty}^{\infty} f(t) \cdot f(t + \tau) dt. \qquad (3)$$

Obviously, the result of autocorrelation of second degree thus obtained is essentially the same as that obtained by the SHG method.

If the photoelectric converter 42 is of a voltage-outputting type, a voltage-to-current converter may be inserted between the photoelectric converter 42 and the TWA 50.

The above description assumes the case where the TWA 50 has linear characteristics. However, as shown in FIGS. 4 and 5, the TWA 50 usually has nonlinear characteristics; for example, $I_{out}=g(i)$ (g is an increasing function) when $I_{in}$ is constant, and $I_{out}$ h($I_{in}$) (h is an increasing function) when i is constant. Even in this usual case, the intensity of output light $I_{out}$ is given by:

$$I_{out} \alpha g(i) \cdot h(I_{in}). \qquad (4)$$

If the waveform of input light $I_{in}$ is written as $f(t)$ and if $i(t)=\gamma \cdot f(t)$ ($\gamma$ is a proportionality constant), the following relation will hold:

$$G(\tau) \propto \int_{-\infty}^{\infty} g[\gamma \cdot f(t)] \times h[f(t + \tau)] dt. \qquad (5)$$

Since the average output $G(\tau)$ of the photodetector 48 can be defined as a function of the delay time $\tau$ if the increasing functions g and h are known, the apparatus of the present invention is capable of estimating $f(t)$ to measure the autocorrelation waveform of the intensity of input light.

Thus, the apparatus of the present invention can utilize the nonlinear characteristics of the TWA 50.

In the foregoing description, the electrical signal $i(t)$ is assumed to be equal to $\gamma \cdot f(t)$ and this means that the correlation of light intensity can be obtained with a resolution comparable to the response time of the photoelectric converter 42.

Figure 17:
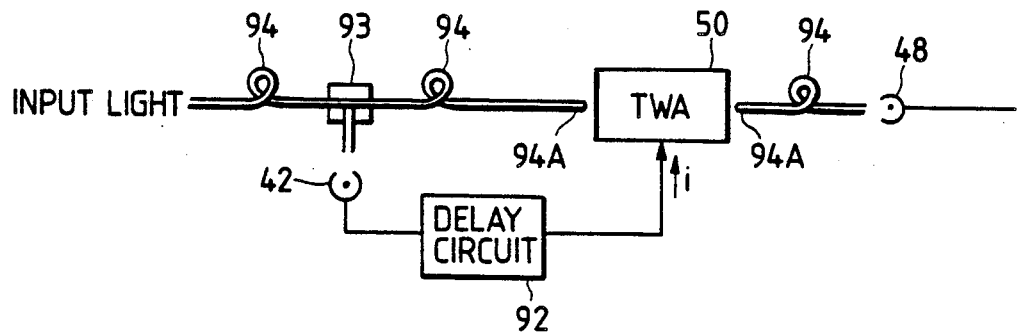
FIG. 17 is a block diagram showing the composition of a light intensity correlating apparatus according to a second embodiment of the present invention.

A second embodiment of the present invention is now described in greater detail with reference to FIG. 17. This embodiment is essentially the same as the first embodiment except that the delay means 46 is designed as an electrical delay circuit 92 which delays an output electrical signal from the photoelectric converter 42 by a variable amount, and that the beam splitting means 40 is designed as a fiber beam splitter 93, with optical fibers 94 being used in the optical path portions.

The gain of TWA 50 includes the efficiency of coupling between the optical fiber 94 (for both light input and output purposes) and TWA 50. In the second embodiment, the end of the optical fiber 94 where it is connected to the TWA 50 is in the form of a hemispherical taper 94A.

The electrical delay circuit 92 used in the second embodiment has the advantage of being simple in composition. In addition, the optical fibers 94 constituting the optical paths eliminate the need for close positional adjustments and increase the degree of freedom in the layout of optical elements.

If desired, enhanced amplification may be performed with a current amplifier 43 (see FIG. 1) that is inserted between the photoelectric converter 42 and the TWA 50.

Figure 18:
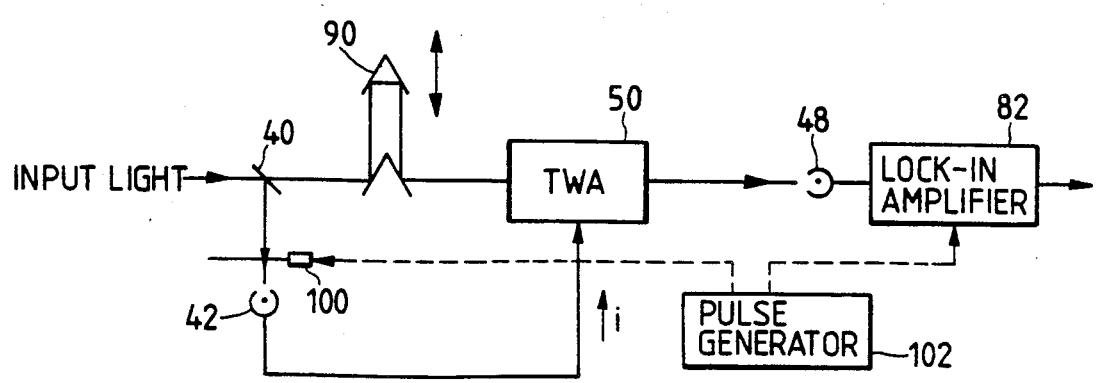
FIG. 18 is a block diagram showing the composition of a light intensity correlating apparatus according to a third embodiment of the present invention.

A third embodiment of the present invention is described below with reference to FIG. 18. This embodiment is generally a light intensity correlating apparatus which comprises, as shown in FIG. 15, a beam splitting means 40, a photoelectric converter 42, an optical modulating means 44, a delay means 46, a photodetector 48, a light chopping device 80, and a lock-in amplifier 82. As shown more specifically in FIG. 18, the optical modulating means 44 is composed of the TWA 50 and the delay means 46 is designed as an optical delay means 90. In addition, the light chopping device 80 is designed as a light chopper 100 which is inserted between the beam splitting means 40 and the photoelectric converter 42, and both the light chopper 100 and the lock-in amplifier 82 are externally driven by a pulse generator 102 at a predetermined frequency.

In this third embodiment, the light chopper 100 and the lock-in amplifier 82 are driven in synchronism with the pulse generator 102, so that lock-in detection is performed to ensure further improvement in SN ratio.

The light chopper 100 need not always be inserted between the beam splitting means 40 and the photoelectric converter 42. If desired, it may be disposed either in the optical path connecting the beam splitting means 40 and the TWA 50 or in the optical path connecting the TWA 50 and the photodetector 48.

If necessary, enhanced amplification may be performed with a current amplifier 43 (see FIG. 1) which is inserted between the photoelectric converter 42 and the TWA 50.

Figure 19:
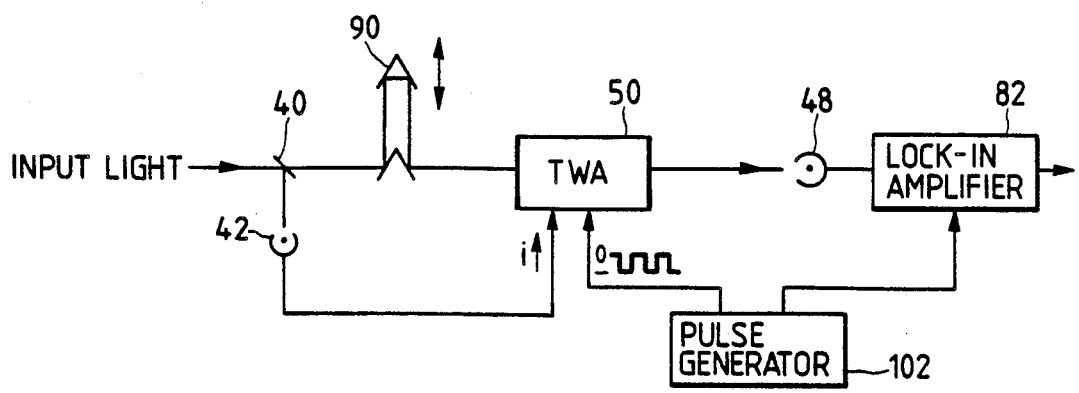
FIG. 19 is a block diagram showing the composition of a light intensity correlating apparatus according to a fourth embodiment of the present invention.

A fourth embodiment of the present invention is now described in greater detail with reference to FIG. 19. This embodiment is essentially the same as the third embodiment except that the TWA 50 itself is also used as a light chopping device. Since a separate optical chopping device need not be provided, the apparatus of the fourth embodiment features a very simple composition.

In this embodiment, enhanced amplification may optionally be performed with a current amplifier 43 (see FIG. 1) that is inserted between the photoelectric converter 42 and the TWA 50.

Figure 20:
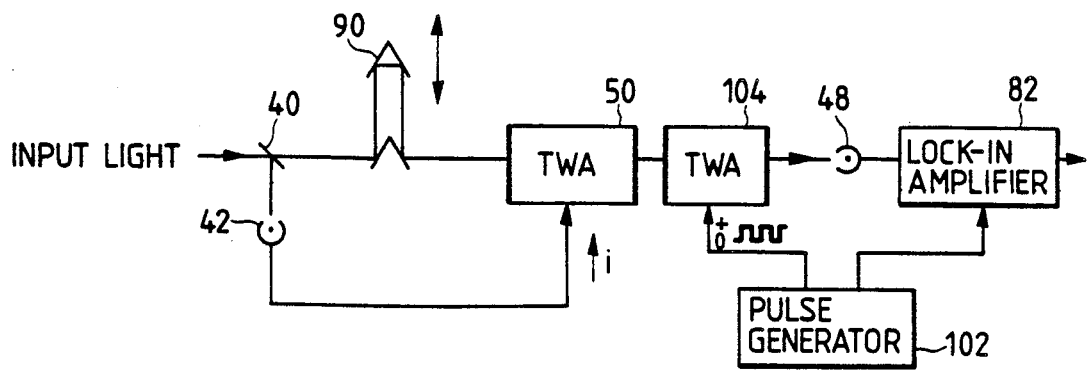
FIG. 20 is a block diagram showing the composition of a light intensity correlating apparatus according to a fifth embodiment of the present invention.
Figure 21:
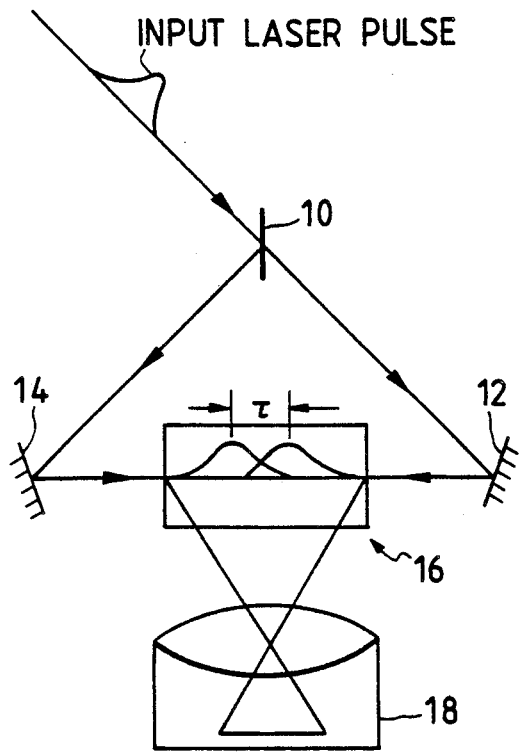
FIG. 21 is an optical path diagram showing the operating principle of measurement by a conventional two-photon fluorescence method.
Figure 22:
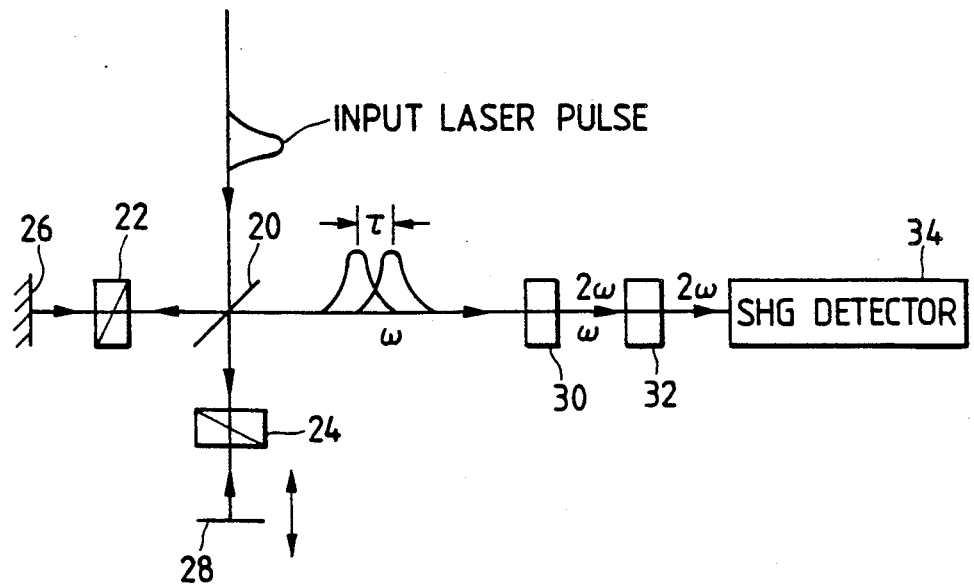
FIG. 22 is an optical path diagram showing the operating principle of measurement by a conventional second-harmonic generation method.

A fifth embodiment of the present invention is described below in greater detail with reference to FIG. 20. This embodiment is also the same as the third embodiment, except that another TWA 104 is disposed as a separate light chopping device downstream of the TWA 50. Since the TWAs 50 and 104 which also function as optical amplifiers are connected in tandem, enhanced amplification is accomplished in this fifth embodiment.

If desired, the TWAs 50 and 104 may be bonded at both end faces to be put together into a unitary assembly so as to increase their strength and resistance to vibration.

If necessary, enhanced amplification may be performed with a current amplifier 43 (see FIG. 1) that is inserted between the photoelectric converter 42 and the TWA 50.

What is claimed is:

1. An apparatus for measuring an autocorrelation waveform of intensity of input light, comprising:
    beam splitting means for dividing said input light into a first and second light beams, said second light beam having an intensity;
    photoelectric converting means for converting said first light beam into an electrical signal;
    delay means for creating a time delay between said second light beam and said electrical signal;
    optical modulating means for modulating said intensity of said second light beam in accordance with said electrical signal to produce output light bearing said autocorrelation waveform, said autocorrelation waveform being a function of said intensity of said input light and said time delay between said second light beam and said electrical signal; and
    photodetecting means having a response time less than said delay time, for detecting said output light from said optical modulating means.

2. The apparatus as claimed in claim 1, further comprising a current amplifier or voltage amplifier, disposed between said photoelectric converting means and said optical modulating means, for amplifying said electrical signal.

3. The apparatus as claimed in claim 1, further comprising means for providing a bias current or constant voltage to said optical modulating means.

4. The apparatus as claimed in claim 1, wherein said optical modulating means comprises an optical amplifier having a gain, said gain being adjustable in accordance with said electrical signal, for amplifying said intensity of said second light beam.

5. The apparatus as claimed in claim 4, wherein said optical amplifier comprises a non-resonant traveling-wave type optical amplifier including a semiconductor laser having end faces, each of said end faces having an anti-reflection coating formed thereon.

6. The apparatus as claimed in claim 1, wherein said optical modulating means comprises an optical modulator having a gain, said gain being adjustable in accordance with said electrical signal, said modulator including a nonlinear electro-optical material.

7. The apparatus as claimed in claim 1, wherein said delay means comprises an electrical delay circuit, disposed between said photoelectric converting means and said optical modulating means, for variably creating said time delay, and wherein said apparatus further comprises optical fibers for transmitting said input light to said beam splitting means, said second light beam to said optical modulating means, and said output light to said photodetecting means.

8. The apparatus as claimed in claimed in claim 1, further comprising:
    light chopping means, disposed between said beam splitting means and said photodetecting means, for turning a light beam on and off at a predetermined frequency; and
    a lock-up amplifier for detecting said output signal from said photodetecting means, said lock-in amplifier having a narrow bandwidth corresponding to said predetermined frequency.

9. The apparatus as claimed in claim 8, wherein said optical modulating means comprises said light chopping means.

* * * * *

UNITED STATES PATENT AND TRADEMARK OFFICE
CERTIFICATE OF CORRECTION

PATENT NO. : 4,994,663

DATED : February 19, 1991

INVENTOR(S) : Shinichiro Aoshima et al.

It is certified that error appears in the above-identified patent and that said Letters Patent is hereby corrected as shown below:

In the Abstract, Lines 1 & 2, change "wavaeform" to --waveform--;

Claim 8, Column 12, Line 28, delete "in claimed";

Claim 8, Column 12, Line 34, change "lock-up" to --lock-in--;

Signed and Sealed this

Twenty-seventh Day of October, 1992

Attest:

DOUGLAS B. COMER

Attesting Officer    Acting Commissioner of Patents and Trademarks